US006275488B1

United States Patent
Cudak et al.

(10) Patent No.: US 6,275,488 B1
(45) Date of Patent: Aug. 14, 2001

(54) VARIABLE RATE SPREAD SPECTRUM COMMUNICATION METHOD AND APPARATUS

(75) Inventors: Mark C. Cudak, McHenry; Brian K. Classon, Streamwood; Louay Jalloul, Palatine; Amitava Ghosh, Vernon Hills, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/442,250

(22) Filed: Nov. 17, 1999

(51) Int. Cl.[7] .................................................. H04B 7/212
(52) U.S. Cl. ................................... 370/347; 370/345
(58) Field of Search .................................. 370/328, 329, 370/330, 336, 337, 346, 347, 348, 431, 468, 349, 310, 312, 319, 345; 371/32, 33

(56) References Cited

U.S. PATENT DOCUMENTS

| | | | | |
|---|---|---|---|---|
| 4,718,066 | * | 1/1988 | Rogard | 371/35 |
| 5,477,550 | * | 12/1995 | Crisler | 371/32 |
| 5,657,325 | * | 8/1997 | Lou | 370/334 |
| 5,754,754 | * | 5/1998 | Dudley | 395/182.16 |
| 5,889,790 | * | 3/1999 | Fukuda | 371/32 |
| 5,946,320 | * | 8/1999 | Decker | 370/428 |
| 6,069,886 | * | 5/2000 | Ayerst | 370/336 |
| 6,111,892 | * | 8/2000 | Rittle | 370/465 |
| 6,134,693 | * | 10/2000 | Fukuda | 714/750 |

OTHER PUBLICATIONS

Shu Lin and Daniel J. Costello, *Error Control Coding: Fundamentals and Applications*, Prentice Hall, 1983, pp. 477–494.

David Chase, "Code Combining—A Maximum–Likelihood Decoding Approach for Combining an Arbitrary Number of Noisy Packets," *IEEE Trans. Commun. Technol.*, vol. COM–33, No. 5, May 1985.

Anwarul Hasan, Vijay K. Bhargava, Tho Le–Ngoc, "Algorithms and Architectures for the Design of a VLSI Reed–Solomon Codec," *Reed–Solomon Codes and Their Applications*, IEEE Press, 1994.

Joachim Hagenauer, "Rate–Compatible Punctured Convolutional Codes (RCPC Codes) and their Applications," *IEEE Transactions on Communications*, vol. 36, No. 4, Apr. 1998.

Samir Kallel, "Generalized Type II Hybrid ARQ Scheme Using Punctured Convolutional Coding,"*IEEE Transactions on Communications*, Vol. 38, No. 11, Nov. 1990.

Douglas N. Rowitch and Laurence B. Milstein, "Rate Compatible Punctured Turbo (RCPT) Codes in a Hybrid FEC/ARQ System," ICC 1997.

Samir Kallel, "Complementary Punctured Convolution (CPC) Codes and Their Applications," *IEEE Transactions on Communications*, vol. 43, No. 6, Jun. 1995.

(List continued on next page.)

*Primary Examiner*—Douglas Olms
*Assistant Examiner*—Ricardo M. Pizarro
(74) *Attorney, Agent, or Firm*—Sayed H. Beladi; Steven May

(57) ABSTRACT

A method in a communication system (100) includes transmitting from a source user (101) a first data packet (111) over a first time frame (121) having a finite time period (131), transmitting from source user (101) a second data packet (112) over a second time frame (122) immediately subsequent to first time frame (121), detecting an acknowledgment of acceptable reception of data packet associated with either first or said second data packets (111 and 112), repeating transmission of first and second data packets (111 and 112) in a sequence of first and second time frames (121 and 122) in a time frame sequence (190) until the detection.

52 Claims, 1 Drawing Sheet

OTHER PUBLICATIONS

Siemans AG, "Comparison of Hybrid ARQ Types I and II–II for TDD", Contribution to number TSGR1#3(99)177to the $3^{rd}$ Generation Partnership Program (3GPP), Nynashamn, Sweden, Mar. 1999.

Xiaoxin, Justin Chuang, Kapil Chawla and Jim Whitehead, "Performance Comparison of Link Adaptation and Incremental Redundancy in Wireless Data Networks," Wireless Communications and Networking Conference, New Orleans, Sep. 21–24, 1999.

Dimitri Bertsekas, Robert Gallager, *Data Networks Second Edition*, Prentice–Hall, 1992, pp. 64–85.

Samir Kallel, "Efficient Hybrid ARQ Protocols with Adaptive Forward Error Correction," *IEEE Transactions on Communications*, vol. 42, No 2/3/4, Feb./Mar./Apr. 1994.

Siemans AG, "ARQ error control techniques", Contribution to number TSGR1#3(99)178to the $3^{rd}$ Generation Partnership Program (3GPP), Nynashamn, Sweden, Mar. 1999.

C. Berrou et.al, "Near Shannon limit error–correcting coding and decoding:turbo codes," Proc. ICC'93, pp. 1064–1070. D. Chase, IEEE Trans. Commun., 1985.

.–C. Chan and E. Geraniotis, "An adaptive hybrid FEC/ARQ protocol using turbo codes," 1997 IEEE International Conference on Universal Personal Communications Record, 1997, pp. 541–545.

K. Narayanan, "A novel ARQ technique using the turbo coding principle," IEEE Commun. Ltrs, p. 49–51, Mar. 1997.

* cited by examiner

VARIABLE RATE SPREAD SPECTRUM COMMUNICATION METHOD AND APPARATUS

REFERENCES TO RELATED APPLICATIONS

This application is related to applications filed on the same day having the same inventorship and assigned to a common assignee. The related applications having Ser. No. 09/442,367 filed Nov. 17, 1999 and Ser. No. 09/603,426 filed on Jun. 26, 2000 respectively, both pending, each of the referenced applications is incorporated by reference herein.

RELATED FIELD OF THE INVENTION

The invention relates to the filed of communications, and more particularly, to data communications.

BACKGROUND OF THE INVENTION

Automatic repeat request (ARQ) schemes are commonly used in data communication to provide a more efficient communication between a source user and a destination user. Several types of ARQ, such as hybrid ARQ, stop-and-wait ARQ, go-back-N (GBN) ARQ and selective repeat (SR) ARQ are available where each provides an efficient use of the communication resources between a source user and a destination user. However, each of the prior arts schemes suffers from at least one problem that makes the communication system more complex, more expensive or inefficient for data communication.

For example, in case of hybrid ARQ, the destination user stores soft versions of the previously sent copies of data packet for soft combining. The data packet with possibly additional incremental redundancy in the channel is sent which increases the coding rate and effectively lowering the communication data rate. The destination user may effectively soft-combine the soft copy stored in the memory with the newly arrived soft copy to decode the data in the data packet. The communication system resources may remain idle between the previous and the new transmission times. The complexity of the communication system as a result is increased due to requirements of additional control, code construction, decoder implementation, and memory requirements.

In case of selective repeat ARQ, source user transmits data packets with a sequence number to be decoded by the destination user. If a data packet arrives with error at the destination user, the destination user sends a message to the source user for retransmission of the packet of data while identifying the data packet sequence number. Depending on the length of delay of such feedback to the source user, the maximum sequence number is increased to allow for the length of the feedback delay. As such, the destination user, for example a mobile station, may be required to have a large memory segment to store transmission of packets of data until all data packets including the packet with the maximum sequence number have arrived without error. The number of data packets stored at the destination user may increase substantially which places a high burden on the memory requirements.

In case of stop-and-wait ARQ, the source user transmits only one packet of data and waits until it receives an indication of successful reception at the destination user, then the source user transmits another data packet. The communication channel remains idle while the source is waiting for the acknowledgment. As such, low usage of the available communication bandwidth resulting in an inefficient communication is a problem associated with stop-and-wait.

Hybrid ARQ may be coupled with stop and wait scheme, however, the result does not overcome the idle communication channel problem experience while waiting for the acknowledgment. Hybrid ARQ may also be coupled with selective repeat scheme; however, the result is not without the known problems. In fact, when hybrid ARQ is coupled with the selective repeat scheme, the requirement of the memory size is substantially increased because in addition to the storing at least one copy of the data packets, additional copies may need to be stored for soft combining operation of the hybrid ARQ portion.

Therefore, there is a need for a method and apparatus of ARQ which provides efficient use of the communication resources without the known complexity of the prior arts.

DETAILED DESCRIPTION OF THE PREFERRED EMBODIMENTS

Figure 1:
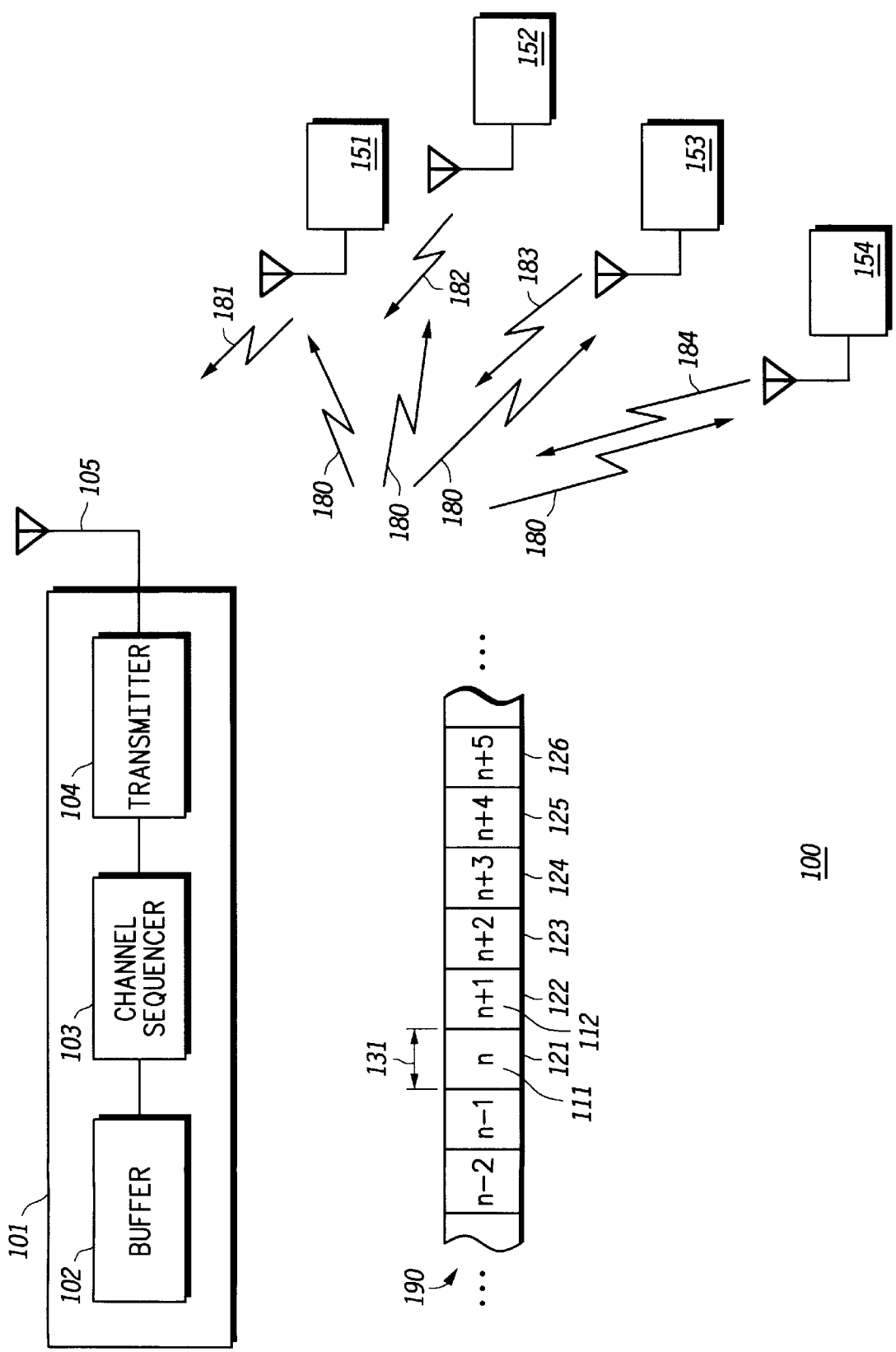
FIG. 1 depicts a communication system employing various aspects of the invention.

According to various aspects of the invention, a method and apparatus provides an automatic request scheme which results in an efficient use of the communication resources without an added complexity or cost. According to the invention while referring to FIG. 1, in a communication system 100, a source user 101 transmits a first data packet 111 over a first time frame 121 having a finite time period 131. Source user 101 may be a base station in communication system 100. Source user 101 may be in communication with several destination users such as destination users 151–54. Such communication may by way of a forward link 180 received by a group of targeted destination users, and a corresponding reverse links 181–84. Such destination users may be mobile stations in communication system 100. Communication system 100 may be operating according to any of the known communication standards such as GSM, IS-95A, B and C, and Wideband Code Division Multiple Access (WCDMA) of the Third Generation Partnership Program. Source user 101 transmits a second data packet 112 over a second time frame 122, where second time frame 122 is immediately subsequent to first time frame 121 in a sequence of time frames 190. Sequence of time frames 190 is transmitted via forward link 180.

When a destination user receives a data packet and decodes the packet satisfactorily without error according to a standard, the destination user transmits back on a control channel via a reverse link an acknowledgment message to the source user acknowledging acceptable reception of the data packets. In this case, if first data packet 111 is targeted for destination user 151, destination user 151 transmits an acknowledgement via reverse link 181 to source user 101 acknowledging acceptable reception of the first data packet 111.

Source user 101 repeats transmission of first and second data packets 111 and 112 in a sequence of first and second time frames 121 and 122 until detecting the acknowledgment of acceptable reception of either data packet 111 or 112. After transmission of data packets 111, source user 101 expects detection of an acknowledgment of acceptable reception of data packet 111, and similarly after transmission of data packet 112, source user 101 expects detection of an acknowledgment of acceptable reception of data packet 112. If acknowledgement associated with data packet 111 has not arrived at source user 101 before transmitting a time frame 123, transmission of data packet 111 is repeated in time frame 123 which is immediately subsequent to time frame 112. Similarly, if acknowledgement associated data packets 112 has not arrived before transmitting a time frame 124, transmission of data packet 112 is repeated in time frame 124. The transmission sequence of data packets 111 and 112 is repeated until arrival of an acknowledgement associated with either data packets 111 or 112. In all cases above describing a repeat of data packet, it is possible to substitute an associated packet constructed entirely of parity information or an alternate combination of information and parity. This substitution represents an alternate form of Hybrid ARQ known as Incremental Redundancy.

After the acknowledgment of acceptable reception to either data packet 111 or 112, source user terminates transmission of its associated data packet. Source user 101 transmits a third data packet in substitute of the terminated data packet in the sequence of the first and second time frames.

The sequence of the first and second time frames may be consecutively odd and even numbered time frames in numbered time frames such as time frame sequence 190 in a time division multiple access communication system. If time frame 121 is numbered as "n", an even number time frame, time frame 122 is then an odd numbered time frame, time frame "n+1". Similarly time frame 123, time frame "n+2", is an even numbered time frame, and time frame 124, time frame "n+3", an odd numbered time frame, and so on. The first time frame may be referred to as an odd numbered channel and second time frames as an even numbered channel immediately subsequent to the odd numbered channel in a time division multiple access communication system.

If data packet 111 was transmitted on an even numbered time frame and data packet 112 on an odd numbered time frame of sequence of time frames 190, transmission of data packets 111 and 112 on even and odd numbered time frames continues until an acknowledgement associated with either data packet 111 or 112 is detected at source user 101. For example, if the acknowledgement is associated with data packet 112, a third data packet is selected for transmission in substitute of the data packet 112. As such, the third data packet is transmitted on the odd time frames, and the data packet 111 on the even time frames of sequence of time frames 190.

The first and second data packets may be transmitted for a same destination user or a first and second destination users. For example, in down link 180, data packets 111 and 112 may be destined for a single destination user such as any of the destination users 151–54. In another situation, the data packets 111 and 112 may be destined for respectively destination users 151 and 152, for example. Similarly, any substituted data packet may be for the same or different destination users.

In case the downlink received by a destination user is in poor condition, an acknowledgement may not be transmitted from the destination user for some time. During this time, the data packets destined for such a destination user may be repeated many times in the first and second time frames. To avoid unnecessary usage of the communication resources in the down link 180, source user 101 limits transmission of the data packet to a predetermined number of repetitions.

Source user 101, along with other blocks such as an encoder (not shown), may include a queue buffer 102 for buffering data packets for transmission. A channel sequencer 103 retrieves the first and second data packets from queue buffer 102 and aligns the first and second data packets in sequence to be received by a transmitter 104 for transmission from an antenna 105 from source user 101. Queue buffer 102 may buffer data packets according to a transmission priority of the first and second data packets. In case of transmitting a third data packet, the first, second and third data packets are queued in buffer for transmission from the source user according to a transmission priority. The third data packet may be selected from a plurality of data packets in queue buffer 102 based on a transmission priority when being substituted for either the first or the second data packet in the sequence of the first and second (i.e. even and odd or odd and even) time frames.

To perform hybrid ARQ portion, the destination users combines correspondingly soft copies of the repeated transmission of data packets for decoding the data in the data packet. Once a data packet satisfactorily is decoded via soft combining, the destination user generates and transmits an acknowledgment of acceptable reception of data packet. As such, when the first and second data packets are destined for the same destination user as a mobile station, the mobile station is required to have a memory buffer for storing the first and second data packets upon arrival. In case of soft combining, soft copies of the first and second data packets may need to be stored. This is a substantial reduction in memory requirement in a mobile station operating in a communication system relative to alternative ARQ schemes according to various aspects of the invention.

In case the acknowledgment of acceptable repetition of a data packet can not arrive within a time frame, a time in units of a finite time period is determined when at a source user a feedback acknowledgment can arrive acknowledging acceptable reception of a data packet at a destination user. The finite time period may equal to duration of time frame. A source user transmits multiple data packets in a sequence of multiple time frames equal to the determined units of time frames. While waiting for detecting an acknowledgment of acceptable reception of data packet associated with either one of the multiple data packets, transmission of the multiple of data packets in the sequence of multiple time frames is repeated. The time may be approximately an earliest time when at the source user the feedback acknowledgment can arrive acknowledging acceptable reception of the data packet at a destination user.

After detecting an acknowledgement, transmission of either one of the multiple data packets associated with the acknowledgement in the sequence of multiple time frames is terminated. A new data packet is transmitted in substitute of the terminated data packet in the sequence of the multiple time frames. The multiple data packets may be transmitted for a same destination user, or a multiple destination users. The number of retransmission of the multiple data packets may be limited according to a predetermined number of repetitions to avoid unnecessary usage of the communication resources in case of a poor communication between the source user and one of the destination users.

The multiple time frames may be consecutively numbered time frames in a numbered time frames in a time division multiple access communication system. At the destination users, soft copies of the repeated transmission of data packets correspondingly are combined for generating and transmitting a corresponding acknowledgment of acceptable reception of data packet.

When used in a Code Division Multiple Access (CDMA) system, it is possible to send multiple packets in the even period and multiple packets in the odd period. When anyone of the multiple packets is acknowledged it may be replaced independently of all the other packets in the manner described previously. Various aspects of the invention may be implemented by way of software or hardware implementations. Use of such methods is well known in the art. The source user may be a base station and the destination user may be mobile stations in a cellular communication system. The source user and destination user may also employ an encoding and decoding apparatus known in the art.

What is claimed is:

1. A method in a communication system comprising the steps of:

transmitting from a source user a first data packet over a first time frame having a finite time period;

transmitting from said source user a second data packet over a second time frame, wherein said second time frame is immediately subsequent to said first time frame;

detecting an acknowledgment of acceptable reception of data packet associated with either said first or said second data packet;

repeating transmission of said first and second data packets in a sequence of said first and second time frames until said detecting;

terminating transmission of either said first or second data packet in said sequence of said first and second time frames, wherein said terminated data packet is associated with said detected associated acknowledgment; and transmitting a third data packet in substitute of said terminated data packet in said sequence of said first and second time frames.

2. The method as recited in claim 1 wherein retransmission of at least either said first and second data packets is associated with a first transmission of correspondingly said first and second data packets.

3. The method as recited in claim 2 wherein said association is related to incremental redundancy.

4. The method as recited in claim 1 wherein said acknowledgement associated with said first data packet is expected to arrive after transmission of said first time frame and said acknowledgement associated with said second data packets is expected to arrive after transmission of said second time frame.

5. The method as recited in claim 1 wherein said first and second data packets are transmitted for a same destination user, or a first and second destination users.

6. The method as recited in claim 1 further comprising the step of limiting said repeating to a predetermined number of repetitions.

7. The method as recited in claim 1 wherein said first and second time frames are consecutively odd and even numbered time frames in a numbered time frames in a time division multiple access communication system.

8. The method as recited in claim 1 wherein said first time frame is an odd numbered channel and second time frames is an even numbered channel immediately subsequent to said odd numbered channel in a time division multiple access communication system.

9. The method as recited in claim 1 further comprising the step of retrieving said first and second data packets from a queue buffer aligning said first and second data packets in sequence for said transmitting from said source user.

10. The method as recited in claim 9 wherein said queue buffer is aligned according to a transmission priority of said first and second data packets.

11. The method as recited in claim 1 further comprising the step of retrieving said first, second and third data packets from a queue buffer aligning said first, second and third data packets in sequence for said transmitting from said source user.

12. The method as recited in claim 11 wherein said queue buffer is aligned according to a transmission priority of said first, second and third data packets.

13. The method as recited in claim 11 further comprising the step of selecting said third data packet from a plurality of data packets in said queue buffer based on a transmission priority aligning said third data packet in said queue buffer.

14. The method as recited in claim 1 further comprising the step of combining correspondingly soft copies of said repeated transmission of data packets for generating and transmitting said acknowledgment of acceptable reception of data packet.

15. A method in a communication system comprising the steps of:

determining a time in units of a finite time period when at a source user a feedback acknowledgment arrives acknowledging acceptable reception of a data packet at a destination user;

transmitting from said source user multiple data packets over correspondingly in a sequence of multiple time frames equal to said determined units of time frames;

detecting an acknowledgment of acceptable reception of data packet associated with either one of said multiple data packets;

repeating transmission of said multiple of data packets in said sequence of multiple time frames until said detecting;

terminating transmission of either one of said multiple data packets in said sequence of multiple time frames, wherein said terminated data packet is associated with said detected associated acknowledgment; and transmitting a new data packet in substitute of said terminated data packet in said sequence of said multiple time frames.

16. The method as recited in claim 15 wherein said time is approximately an earliest time when at said source user said feedback acknowledgment arrives acknowledging acceptable reception of said data packet at a destination user.

17. The method as recited in claim 15 wherein said multiple data packets are transmitted for a same destination user, or a multiple destination users.

18. The method as recited in claim 15 further comprising the step of limiting said repeating to a predetermined number of repetitions.

19. The method as recited in claim 15 wherein said multiple time frames are consecutively numbered time frames in a numbered time frames in a time division multiple access communication system.

20. The method as recited in claim 15 wherein said multiple time frames are consecutively numbered channels in a time division multiple access communication system.

21. The method as recited in claim 15 further comprising the step of combining correspondingly soft copies of said repeated transmission of data packets for generating and transmitting said acknowledgment of acceptable reception of data packet.

22. An apparatus in a communication system comprising:

means for transmitting from a source user a first data packet over a first time frame having a finite time period;

means for transmitting from said source user a second data packet over a second time frame, wherein said second time frame is immediately subsequent to said first time frame;

means for detecting an acknowledgment of acceptable reception of data packet associated with either said first or said second data packet;

means for repeating transmission of said first and second data packets in a sequence of said first and second time frames until said detecting;

means for terminating transmission of either said first or second data packet in said sequence of said first and second time frames, wherein said terminated data packet is associated with said detected associated acknowledgment; and means for transmitting a third data packet in substitute of said terminated data packet in said sequence of said first and second time frames.

23. The apparatus as recited in claim 22 further comprising:

means for combining correspondingly soft copies of said repeated transmission of data packets for generating and transmitting said acknowledgment of acceptable reception of data packet.

24. An apparatus in a communication system comprising means for determining a time in units of a finite time period when at a source user a feedback acknowledgment arrives acknowledging acceptable reception of a data packet at a destination user;

means for transmitting from said source user multiple data packets over correspondingly in a sequence of multiple time frames equal to said determined units of time frames;

means for detecting an acknowledgment of acceptable reception of data packet associated with either one of said multiple data packets;

means for repeating transmission of said multiple of data packets in said sequence of multiple time frames until said detecting;

means for terminating transmission of either one of said multiple data packets in said sequence of multiple time frames, wherein said terminated data packet is associated with said detected associated acknowledgment; and means for transmitting a new data packet in substitute of said terminated data packet in said sequence of said multiple time frames.

25. The apparatus as recited in claim 24 further comprising:

means for combining correspondingly soft copies of said repeated transmission of data packets for generating and transmitting said acknowledgment of acceptable reception of data packet.

26. The method as recited in claim 3 wherein said acknowledgement associated with said first data packet is expected to arrive after transmission of said first time frame and said acknowledgement associated with said second data packets is expected to arrive after transmission of said second time frame.

27. The method as recited in claim 3 wherein said first and second data packets are transmitted for a same destination user, or a first and second destination users.

28. The method as recited in claim 3 further comprising the step of limiting said repeating to a predetermined number of repetitions.

29. The method as recited in claim 3 wherein said first and second time frames are consecutively odd and even numbered time frames in a numbered time frames in a time division multiple access communication system.

30. The method as recited in claim 3 wherein said first time frame is an odd numbered channel and second time frames is an even numbered channel immediately subsequent to said odd numbered channel in a time division multiple access communication system.

31. The method as recited in claim 3 further comprising the step of retrieving said first and second data packets from a queue buffer aligning said first and second data packets in sequence for said transmitting from said source user.

32. The method as recited in claim 31 wherein said queue buffer is aligned according to a transmission priority of said first and second data packets.

33. The method as recited in claim 3 further comprising the step of retrieving said first, second and third data packets from a queue buffer aligning said first, second and third data packets in sequence for said transmitting from said source user.

34. The method as recited in claim 33 wherein said queue buffer is aligned according to a transmission priority of said first, second and third data packets.

35. The method as recited in claim 33 further comprising the step of selecting said third data packet from a plurality of data packets in said queue buffer based on a transmission priority aligning said third data packet in said queue buffer.

36. The method as recited in claim 3 further comprising the step of combining correspondingly soft copies of said repeated transmission of data packets for generating and transmitting said acknowledgment of acceptable reception of data packet.

37. The method as recited in claim 14 wherein said acknowledgement associated with said first data packet is expected to arrive after transmission of said first time frame and said acknowledgement associated with said second data packets is expected to arrive after transmission of said second time frame.

38. The method as recited in claim 14 wherein said first and second data packets are transmitted for a same destination user, or a first and second destination users.

39. The method as recited in claim 14 further comprising the step of limiting said repeating to a predetermined number of repetitions.

40. The method as recited in claim 14 wherein said first and second time frames are consecutively odd and even numbered time frames in a numbered time frames in a time division multiple access communication system.

41. The method as recited in claim 14 wherein said first time frame is an odd numbered channel and second time frames is an even numbered channel immediately subsequent to said odd numbered channel in a time division multiple access communication system.

42. The method as recited in claim 14 further comprising the step of retrieving said first and second data packets from a queue buffer aligning said first and second data packets in sequence for said transmitting from said source user.

43. The method as recited in claim 42 wherein said queue buffer is aligned according to a transmission priority of said first and second data packets.

44. The method as recited in claim 14 further comprising the step of retrieving said first, second and third data packets from a queue buffer aligning said first, second and third data packets in sequence for said transmitting from said source user.

45. The method as recited in claim 44 wherein said queue buffer is aligned according to a transmission priority of said first, second and third data packets.

46. The method as recited in claim 44 further comprising the step of selecting said third data packet from a plurality of data packets in said queue buffer based on a transmission priority aligning said third data packet in said queue buffer.

47. The method as recited in claim 15, wherein retransmission of at least either said first and second data packets is associated with a first transmission of correspondingly said first and second data packets.

48. The method as recited in claim 47, wherein said association is related to incremental redundancy.

49. The apparatus as recited in claim 22, wherein retransmission of at least either said first and second data packets is associated with a first transmission of correspondingly said first and second data packets.

50. The apparatus as recited in claim 49, wherein said association is related to incremental redundancy.

51. The apparatus as recited in claim 24, wherein retransmission of at least either said first and second data packets is associated with a first transmission of correspondingly said first and second data packets.

52. The apparatus as recited in claim 51, wherein said association is related to incremental redundancy.

* * * * *

UNITED STATES PATENT AND TRADEMARK OFFICE
CERTIFICATE OF CORRECTION

PATENT NO. : 6,275,488 B1
DATED : August 14, 2001
INVENTOR(S) : Smith et al.

It is certified that error appears in the above-identified patent and that said Letters Patent is hereby corrected as shown below:

<u>Title page,</u>
Item [54], Title, reads "VARIABLE RATE SPREAD SPECTRUM COMMUNICATION METHOD AND APPARATUS" and it should read -- MULTI CHANNEL STOP AND WAIT ARQ COMMUNICATION METHOD AND APPARATUS --

Signed and Sealed this

Second Day of April, 2002

*Attest:*

JAMES E. ROGAN
*Attesting Officer*       *Director of the United States Patent and Trademark Office*